(12) United States Patent
Baruch et al.

(10) Patent No.: US 11,080,242 B1
(45) Date of Patent: Aug. 3, 2021

(54) MULTI COPY JOURNAL CONSOLIDATION

(71) Applicant: EMC Corporation, Hopkinton, MA (US)

(72) Inventors: Leehod Baruch, Rishon Leziyon (IL); Assaf Natanzon, Tel Aviv (IL); Jehuda Shemer, Kfar Saba (IL); Saar Cohen, Moshav (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 803 days.

(21) Appl. No.: 15/084,819

(22) Filed: Mar. 30, 2016

(51) Int. Cl.
*G06F 17/00* (2019.01)
*G06F 7/00* (2006.01)
*G06F 16/178* (2019.01)
*G06F 16/11* (2019.01)

(52) U.S. Cl.
CPC .......... *G06F 16/178* (2019.01); *G06F 16/128* (2019.01)

(58) Field of Classification Search
CPC .............................. G06F 16/178; G06F 16/128
USPC ......................................................... 707/620
See application file for complete search history.

(56) References Cited

U.S. PATENT DOCUMENTS

| | | | | |
|---|---|---|---|---|
| 5,600,834 A * | 2/1997 | Howard | .............. | G06F 11/1435 713/178 |
| 7,546,428 B1 * | 6/2009 | McAndrews | ....... | G06F 11/1456 707/999.202 |
| 7,549,027 B1 * | 6/2009 | McAndrews | ....... | G06F 11/1469 707/999.202 |
| 7,930,315 B2 * | 4/2011 | Margolus | ............ | G06F 16/2358 707/781 |
| 8,046,547 B1 * | 10/2011 | Chatterjee | ........... | G06F 11/1461 707/649 |
| 8,060,713 B1 * | 11/2011 | Natanzon | ............ | G06F 16/2358 711/162 |
| 8,171,246 B2 * | 5/2012 | Balasubramanian | ........................ | G06F 3/0608 711/162 |
| 8,180,984 B1 * | 5/2012 | Per | ...................... | G06F 11/1451 707/641 |
| 8,281,093 B1 * | 10/2012 | Krishnan | ............ | G06F 11/1469 711/162 |
| 8,332,354 B1 * | 12/2012 | Chatterjee | ........... | G06F 11/1461 707/624 |
| 8,560,827 B1 * | 10/2013 | Yiftachel | ............. | G06Q 10/067 713/100 |
| 8,719,225 B1 * | 5/2014 | Rath | ....................... | G06F 16/27 707/634 |
| 8,775,368 B1 * | 7/2014 | Burke | ................... | G06F 16/122 707/609 |
| 8,805,847 B2 * | 8/2014 | Wang | .................. | G06F 11/1453 707/740 |
| 9,031,913 B1 * | 5/2015 | Natanzon | ................ | G06F 3/067 707/648 |
| 9,396,202 B1 * | 7/2016 | Drobychev | .......... | G06F 16/1744 |
| 9,613,104 B2 * | 4/2017 | Smith | ................. | G06F 11/1446 |
| 9,678,977 B1 * | 6/2017 | Aronovich | .......... | G06F 16/1752 |
| 9,928,246 B1 * | 3/2018 | Xu | ........................ | G06F 16/128 |

(Continued)

*Primary Examiner* — Pavan Mamillapalli
(74) *Attorney, Agent, or Firm* — Krishnendu Gupta; Deepika Bhayana; Dorothy Wu Chiang

(57) ABSTRACT

A computer implemented method, system, and program product comprising examining points in time in each journal of each of the replication sites, determining certain points of time in each journal of each of the replication sites to be deleted based on a policy, and deleting the certain points of time in each journal of each of the replication sites.

20 Claims, 11 Drawing Sheets

(56) References Cited

U.S. PATENT DOCUMENTS

| | | | |
|---|---|---|---|
| 10,140,188 B2* | 11/2018 | Wallace | G06F 16/128 |
| 2005/0182910 A1* | 8/2005 | Stager | G06F 11/1456 |
| | | | 711/162 |
| 2006/0236061 A1* | 10/2006 | Koclanes | G06F 3/0605 |
| | | | 711/170 |
| 2009/0063422 A1* | 3/2009 | Kodama | G06F 16/24 |
| 2009/0300303 A1* | 12/2009 | Balasubramanian | |
| | | | G06F 3/0608 |
| | | | 711/162 |
| 2011/0137870 A1* | 6/2011 | Feder | G06F 16/174 |
| | | | 707/662 |
| 2012/0136827 A1* | 5/2012 | Wang | G06F 11/2097 |
| | | | 707/623 |
| 2012/0203742 A1* | 8/2012 | Goodman | G06F 11/1451 |
| | | | 707/646 |
| 2013/0024423 A1* | 1/2013 | Doshi | G06F 11/1448 |
| | | | 707/640 |
| 2013/0073714 A1* | 3/2013 | Wang | G06F 16/273 |
| | | | 709/224 |
| 2014/0149354 A1* | 5/2014 | Chan | G06F 9/455 |
| | | | 707/639 |
| 2014/0236899 A1* | 8/2014 | Eggers | G06F 3/0604 |
| | | | 707/639 |
| 2014/0379715 A1* | 12/2014 | Kesselman | G06F 3/067 |
| | | | 707/737 |
| 2015/0032690 A1* | 1/2015 | Hoque | G06F 16/178 |
| | | | 707/610 |
| 2015/0046502 A1* | 2/2015 | Pandey | G06F 16/289 |
| | | | 707/809 |
| 2015/0052321 A1* | 2/2015 | Ammons | G06F 16/128 |
| | | | 711/162 |
| 2015/0066857 A1* | 3/2015 | Dayal | G06F 16/128 |
| | | | 707/639 |
| 2015/0067319 A1* | 3/2015 | Han | G06F 3/0617 |
| | | | 713/2 |
| 2015/0081636 A1* | 3/2015 | Schindler | G06F 11/1482 |
| | | | 707/639 |
| 2015/0106330 A1* | 4/2015 | Giampaolo | G06F 16/178 |
| | | | 707/634 |
| 2015/0149411 A1* | 5/2015 | Plisko | G06F 16/178 |
| | | | 707/639 |
| 2015/0178167 A1* | 6/2015 | Kulkarni | G06F 16/284 |
| | | | 707/649 |
| 2016/0274975 A1* | 9/2016 | Chen | G06F 11/1451 |
| 2016/0378781 A1* | 12/2016 | Jerrard-Dunne | G06F 16/1748 |
| | | | 707/692 |
| 2017/0060449 A1* | 3/2017 | Zucca | G06F 11/1448 |
| 2017/0097873 A1* | 4/2017 | Krishnamachari | G06F 3/0604 |
| 2017/0123935 A1* | 5/2017 | Pandit | G06F 16/27 |
| 2017/0147648 A1* | 5/2017 | Aronovich | G06F 16/128 |
| 2017/0192857 A1* | 7/2017 | Meiri | G06F 16/125 |
| 2017/0242599 A1* | 8/2017 | Patnaik | G06F 3/0619 |

* cited by examiner

MULTI COPY JOURNAL CONSOLIDATION

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location. Data replication systems generally operate either at the application level, at the file system level, at the hypervisor level or at the data block level.

Current data protection systems try to provide continuous data protection, which enable the organization to roll back to any specified point in time within a recent history. Continuous data protection systems aim to satisfy two conflicting objectives, as best as possible; namely, (i) minimize the down time, in which the organization production site data is unavailable, during a recovery, and (ii) enable recovery as close as possible to any specified point in time within a recent history.

Continuous data protection typically uses a technology referred to as "journaling," whereby a log is kept of changes made to the backup storage. During a recovery, the journal entries serve as successive "undo" information, enabling rollback of the backup storage to previous points in time. Journaling was first implemented in database systems, and was later extended to broader data protection.

One challenge to continuous data protection is the ability of a backup site to keep pace with the data transactions of a production site, without slowing down the production site. The overhead of journaling inherently requires several data transactions at the backup site for each data transaction at the production site. As such, when data transactions occur at a high rate at the production site, the backup site may not be able to finish backing up one data transaction before the next production site data transaction occurs. If the production site is not forced to slow down, then necessarily a backlog of un-logged data transactions may build up at the backup site. Without being able to satisfactorily adapt dynamically to changing data transaction rates, a continuous data protection system chokes and eventually forces the production site to shut down.

SUMMARY

A computer implemented method, system, and program product comprising examining points in time in each journal of each of the replication sites, determining certain points of time in each journal of each of the replication sites to be deleted based on a policy, and deleting the certain points of time in each journal of each of the replication sites.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 6 is a simplified example of a method for consolidating points in time, in accordance with an embodiment of the present disclosure;

DETAILED DESCRIPTION

Figure 1:
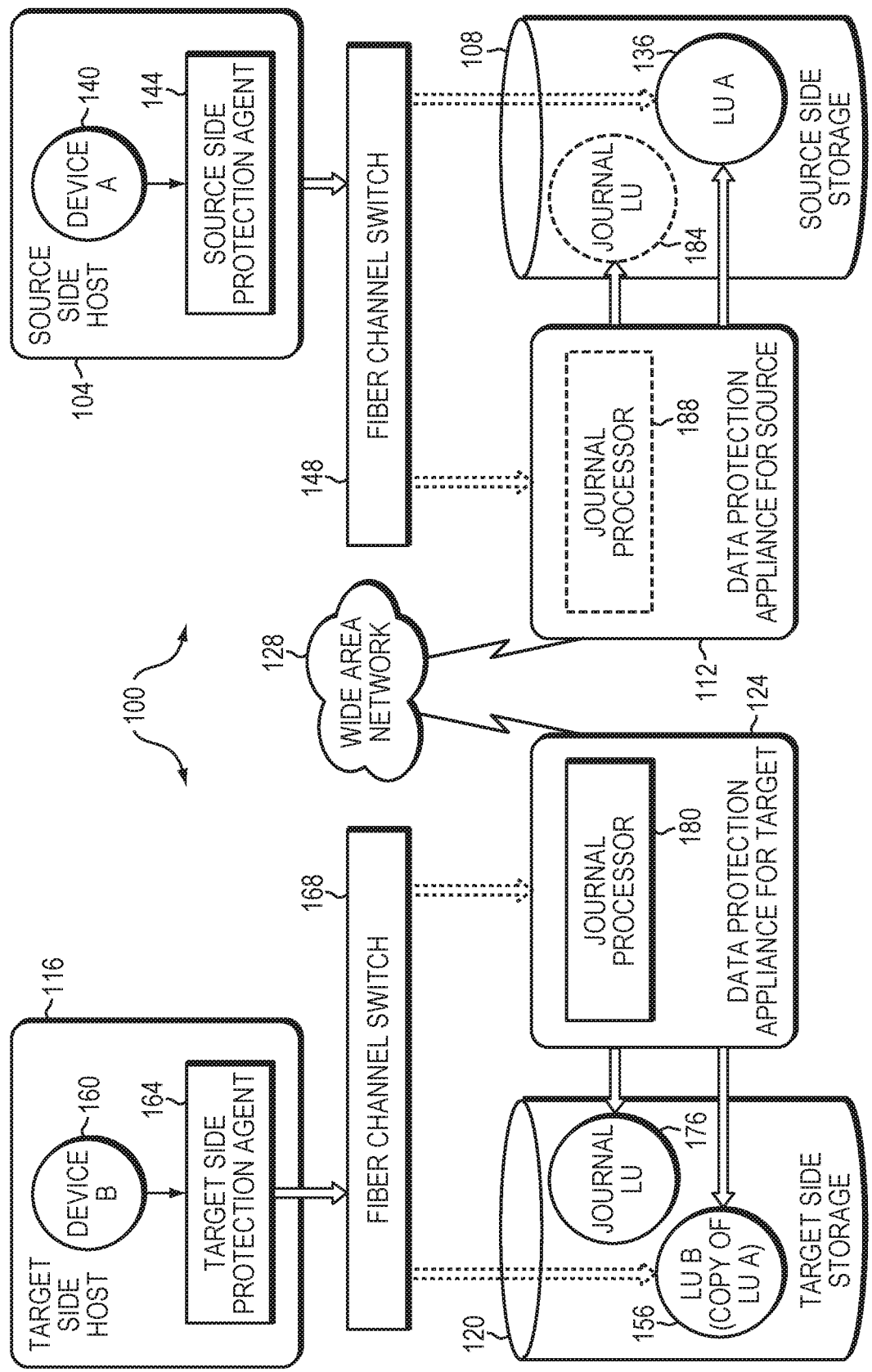
FIG. 1 is a simplified illustration of a data protection system, in accordance with an embodiment of the present disclosure.

In certain embodiments, in continuous replication and snap or snapshot based replication, backup of a history of a protected production volume, protected production volumes, or a consistency group may be stored on a replica array. In most embodiments, a history or a journal may consume capacity or storage space. In certain embodiments, such as in snap based replication, a history or snapshot may also consume limited snapshot resources on a storage array.

In certain embodiments, an amount of capacity that may be required for a history may depend on many factors. In some embodiments, a protection window, which may indicate an oldest point in time that can be restored in case of production disaster, may influence the amount of storage space for a history. In most embodiments, the size of a protection window size may positively correlate with an amount of required capacity. In many embodiments, a change rate of the data and locality of reference—which may be properties of an IO pattern that measures the amount of changes to protected volumes as a function of time, may impact a protection window. In some embodiments, larger change rates and small locality of reference indicate that more capacity may be needed. In other embodiments, granularity of points in time that may be available for image access may increase capacity as the more points are needed a higher capacity that may be required. In still further embodiments, other factors like de-dupability and compressibility may impact a required capacity of a replica journal or history.

In a particular embodiment for any point in time replication, a journal of a replica may contain data to allow restoring production to a specific point in time up to a single IO granularity. In many embodiments, restoring data to a single granularity of an IO may require a large amount of capacity. In some embodiments, certain arrays may have a limit of a number of snapshots of a certain size. In many embodiments, in a scaled environment with many volumes, there may be a limit on the number of snapshots in a journal.

In certain embodiments, replications systems may support replication of a data to different replication sites. In some embodiments, a volume may be replicated to multiple sites. In some embodiments, data may be replicated to multiple sites for redundancy. In other embodiments, data may be replicated to multiple sites for speed of replication. In further embodiments, data may be replicated to multiple sites for speed of access.

In most embodiments, each site to which data is replicated may be independent. In many embodiments, each replica site may have its own journal and replication properties. In some embodiments, each replication site may have its own protection window. In further embodiments, each replication site may have its own granularity with respect to points in time and/or overall replication granularity. In many embodiments, if there are multiple site to which the same data is being replicated, there may be multiple redundant points in time or snapshots corresponding to the same points in time. In some embodiments, a retention policy may correspond to how long a journal or history covers. In certain embodiments, a journal capacity may be specified by a period of time. In other embodiments, a journal may be specified by a capacity of the journal. In many embodiments, a retention policy may denote when a snapshot may be deleted from an end of a journal. In some embodiments, a consolidation policy may be used to determine what points in time may be deleted from a middle of the journal, where multiple points in time store the same or similar snapshots.

In certain embodiments, duplicated snapshots or points in time may be deleted across multiple sites to which data is being replicated. In some embodiments, points in time that are available for image access or production restore from the journal of a copy may be deleted on certain replication sites. In many embodiments, deletion of points in time or restoration of the production site may reduce a capacity of a journal and, in snap based replication, may free up snapshot resources of the array, while maintaining the original protection window.

In some embodiments, the current disclosure may enable a global journal consolidation approach with inter-copy logic. In certain embodiments, a decision to delete points in time or restoration points across replication sites may be done in a centralized manner. In many embodiments, a global decision may be made as to which points in time or restore points to delete across replication sites. In certain embodiments, the current disclosure may enable decision making where different point in times on different copies are deleted to reduce a total amount of journal capacity on the copies and to reduce the amount of consumes snapshots on the replica copies array, while maintaining the global snapshot granularity. In many embodiments, the current disclosure may ensure that there may be at least one replica copies that contains the desired point in time to restore from across replication sites.

In a particular embodiment, three replication sites may each have a number of points in time. If in this particular embodiment, points in time were deleted across the three replication sites without consideration of overlap then the overall granularity and available points in time may be decreased. In another embodiment, if points in time were deleted to maintain different points of time across three replication sites, overall capacity may be increased by deleting the points in time, but access to a same number of points in time may be maintained.

In certain embodiments, the current disclosure may enable reduction of the overall capacity that is required by a journal on each of a set of replication copies. In many embodiments, reduction of the overall capacity may translate into lower cost of operation. In some embodiments, by combining journals of replication copies, the points in time granularity that is available for production restore may be maximized. In further embodiments, global consolidation may be orthogonal to a snapshot consolidation policy of copies. In most embodiments, a global consolidation policy may not conflict with a consolidation policy of each of the copies. In many embodiments, a decision of which point in time should be deleted may take into account the specific requirements of every copy.

In certain embodiments, the current disclosure may enable the decision of which point in time should be deleted on each copy to be made in a centralized location. In certain embodiments, replication environments may support this type of decision making. In a particular embodiment, EMC's RecoverPoint® architecture may support this type of calculation. In certain embodiments, a central decision making location may be where the data originates or may be the production site.

In certain embodiments, some copies may be stored on premise while others may be on one or more clouds. In some embodiments, when a number of copies increase, it may become difficult to control points in time on the journals of the copies. In many embodiments, the current disclosure may enable a copy management method that allows a user to define a protection window and points in time granularity of the protection across different copies with a minimal cost.

In some embodiments, a global consolidation policy may ensure certain points in time or snapshots retain redundancy across sites. In certain embodiments, a global consolidation policy may allow a point in time to be deleted in some replication sites but maintain the data at one or more other replication sites. In certain embodiments, a global consolidation policy may enable retention of points in time or snapshots at a replication site that has a quick access time. In other embodiments, a global consolidation policy may enable more points of time to be stored across multiple replication sites while minimizing the amount of storage or capacity for the multiple points in time.

In some embodiments, points in time or snapshots may be deleted of slower replication sites. In certain embodiments, point in time or snapshots may be maintained on faster replication sites, such as those with array copies. In other embodiments, points in time or snapshots may be kept on sites to enable a determined amount of redundancy for a given point in time or snapshot. In certain embodiments, a replication site may be array based storage. In other embodiments, a replication site may be deduplicated storage. In other embodiments, there may be different replication sites, where each site may have its own access speed, latency and other characteristics. In many embodiments, each replication site may have a different consolidation policy and may keep different points in time than another replication site based on the consolidation policy. In certain embodiments, a replication policy may define how many snapshots of a total number of snapshots may be at the first day and how many at a first week. In some embodiments, a policy may specify a point in time between consecutive points in time. In some embodiments, a consolidation policy may be run at a single decision making component. In other embodiments, a consolidation policy may be distributed across multiple components. In most embodiments, a consolidation policy may consider journals when deciding what points in time or snapshots to delete. In a particular embodiment, a replication appliance may apply a global consolidation policy. In certain embodiments, a global consideration policy may be dictated by a user. In other embodiments, global consolidation policy may be automatically determined by a set of criteria. In other embodiments, a global consolidation policy may be determined by a set of logic or machine learning.

The following may be helpful in understanding the specification and claims:

BACKUP SITE—may be a facility where replicated production site data is stored; the backup site may be located in a remote site or at the same location as the production site; a backup site may be a virtual or physical site CLONE—a clone may be a copy or clone of the image or images, drive or drives of a first location at a second location;

DELTA MARKING STREAM—may mean the tracking of the delta between the production and replication site, which may contain the meta data of changed locations, the delta marking stream may be kept persistently on the journal at the production site of the replication, based on the delta marking data the DPA knows which locations are different between the production and the replica and transfers them to the replica to make both sites identical.

DPA—may be Data Protection Appliance a computer or a cluster of computers, or a set of processes that serve as a data protection appliance, responsible for data protection services including inter alia data replication of a storage system, and journaling of I/O requests issued by a host computer to the storage system; The DPA may be a physical device, a virtual device running, or may be a combination of a virtual and physical device.

RPA—may be replication protection appliance, is another name for DPA. An RPA may be a virtual DPA or a physical DPA.

HOST—may be at least one computer or networks of computers that runs at least one data processing application that issues I/O requests to one or more storage systems; a host is an initiator with a SAN; a host may be a virtual machine HOST DEVICE—may be an internal interface in a host, to a logical storage unit;

IMAGE—may be a copy of a logical storage unit at a specific point in time;

INITIATOR—may be a node in a SAN that issues I/O requests;

JOURNAL—may be a record of write transactions issued to a storage system; used to maintain a duplicate storage system, and to rollback the duplicate storage system to a previous point in time;

LOGICAL UNIT—may be a logical entity provided by a storage system for accessing data from the storage system;

LUN—may be a logical unit number for identifying a logical unit; may also refer to one or more virtual disks or virtual LUNs, which may correspond to one or more Virtual Machines. As used herein, LUN and LU may be used interchangeably to refer to a LU.

Management and deployment tools—may provide the means to deploy, control and manage the RP solution through the virtual environment management tools PHYSICAL STORAGE UNIT—may be a physical entity, such as a disk or an array of disks, for storing data in storage locations that can be accessed by address;

PRODUCTION SITE—may be a facility where one or more host computers run data processing applications that write data to a storage system and read data from the storage system; may be a virtual or physical site.

SAN—may be a storage area network of nodes that send and receive I/O and other requests, each node in the network being an initiator or a target, or both an initiator and a target;

SOURCE SIDE—may be a transmitter of data within a data replication workflow, during normal operation a production site is the source side; and during data recovery a backup site is the source side; may be a virtual or physical site SNAPSHOT—a Snapshot may refer to differential representations of an image, i.e. the snapshot may have pointers to the original volume, and may point to log volumes for changed locations. Snapshots may be combined into a snapshot array, which may represent different images over a time period.

STORAGE SYSTEM—may be a SAN entity that provides multiple logical units for access by multiple SAN initiators TARGET—may be a node in a SAN that replies to I/O requests;

TARGET SIDE—may be a receiver of data within a data replication workflow; during normal operation a back site is the target side, and during data recovery a production site is the target side; may be a virtual or physical site; a target site may be referred to herein as a replication site;

WAN—may be a wide area network that connects local networks and enables them to communicate with one another, such as the Internet.

SPLITTER/PROTECTION AGENT: may be an agent running either on a production host a switch or a storage array which can intercept IO and split them to a DPA and to the storage array, fail IO redirect IO or do any other manipulation to the IO; the splitter or protection agent may be used in both physical and virtual systems. The splitter may be in the IO stack of a system and may be located in the hypervisor for virtual machines. May be referred to herein as an Open Replicator Splitter (ORS).

VIRTUAL VOLUME: may be a volume which is exposed to host by a virtualization layer, the virtual volume may be spanned across more than one site and or volumes VASA: may be a set of vCenter providers that allow an administrator to manage storage VMFS: may be a virtual machine file system, a file system provided by VMware for storing a virtual machine VMDK: may be a virtual machine disk file containing a disk data in a VMFS. Analog to a LUN in a block storage array Virtual RPA (vRPA)/Virtual DPA (vDPA): may be a DPA running in a VM.

VASA may be vSphere Storage application program interfaces (APIs) for Storage Awareness.

MARKING ON SPLITTER: may be a mode in a splitter where intercepted IOs are not split to an appliance and the storage, but changes (meta data) are tracked in a list and/or a bitmap and I/O is immediately sent to down the IO stack.

FAIL ALL MODE: may be a mode of a volume in the splitter where write and read IOs intercepted by the splitter are failed to the host, but other SCSI commands like read capacity are served.

LOGGED ACCESS: may be an access method provided by the appliance and the splitter, in which the appliance rolls the volumes of the consistency group to the point in time the user requested and let the host access the volumes in a copy on first write base.

VIRTUAL ACCESS: may be an access method provided by the appliance and the splitter, in which the appliance exposes a virtual volume from a specific point in time to the host, the data for the virtual volume is partially stored on the remote copy and partially stored on the journal.

CDP: Continuous Data Protection, may refer to a full replica of a volume or a set of volumes along with a journal which allows any point in time access, the CDP copy is at the same site, and maybe the same storage array of the production site CRR: Continuous Remote Replica may refer to a full replica of a volume or a set of volumes along with a journal which allows any point in time access at a site remote to the production volume and on a separate storage array.

FAST: may be a fully automated storage tiering used to move active data to higher tiers and less active data to lower tiers.

A description of journaling and some techniques associated with journaling may be described in the patent titled METHODS AND APPARATUS FOR OPTIMAL JOURNALING FOR CONTINUOUS DATA REPLICATION and with U.S. Pat. No. 7,516,287, and METHODS AND APPARATUS FOR OPTIMAL JOURNALING FOR CONTINUOUS DATA REPLICATION and with U.S. Pat. No. 8,332,687, which are hereby incorporated by reference. A description of synchronous and asynchronous replication may be described in the patent titled DYNAMICALLY SWITCHING BETWEEN SYNCHRONOUS AND ASYNCHRONOUS REPLICATION and with U.S. Pat. No. 8,341,115, which is hereby incorporated by reference.

A discussion of image access may be found in U.S. patent application Ser. No. 12/969,903 entitled "DYNAMIC LUN RESIZING IN A REPLICATION ENVIRONMENT" filed on Dec. 16, 2010 assigned to EMC Corp., which is hereby incorporated by reference.

Description of Embodiments Using of a Five State Journaling Process

Reference is now made to FIG. 1, which is a simplified illustration of a data protection system 100, in accordance with an embodiment of the present invention. Shown in FIG. 1 are two sites; Site I, which is a production site, on the right, and Site II, which is a backup site, on the left. Under normal operation the production site is the source side of system 100, and the backup site is the target side of the system. The backup site is responsible for replicating production site data. Additionally, the backup site enables rollback of Site I data to an earlier pointing time, which may be used in the event of data corruption of a disaster, or alternatively in order to view or to access data from an earlier point in time.

During normal operations, the direction of replicate data flow goes from source side to target side. It is possible, however, for a user to reverse the direction of replicate data flow, in which case Site I starts to behave as a target backup site, and Site II starts to behave as a source production site. Such change of replication direction is referred to as a "failover". A failover may be performed in the event of a disaster at the production site, or for other reasons. In some data architectures, Site I or Site II behaves as a production site for a portion of stored data, and behaves simultaneously as a backup site for another portion of stored data. In some data architectures, a portion of stored data is replicated to a backup site, and another portion is not.

The production site and the backup site may be remote from one another, or they may both be situated at a common site, local to one another. Local data protection has the advantage of minimizing data lag between target and source, and remote data protection has the advantage is being robust in the event that a disaster occurs at the source side.

The source and target sides communicate via a wide area network (WAN) 128, although other types of networks are also adaptable for use with the present invention.

In accordance with an embodiment of the present invention, each side of system 100 includes three major components coupled via a storage area network (SAN); namely, (i) a storage system, (ii) a host computer, and (iii) a data protection appliance (DPA). Specifically with reference to FIG. 1, the source side SAN includes a source host computer 104, a source storage system 108, and a source DPA 112. Similarly, the target side SAN includes a target host computer 116, a target storage system 120, and a target DPA 124.

Generally, a SAN includes one or more devices, referred to as "nodes". A node in a SAN may be an "initiator" or a "target", or both. An initiator node is a device that is able to initiate requests to one or more other devices; and a target node is a device that is able to reply to requests, such as SCSI commands, sent by an initiator node. A SAN may also include network switches, such as fiber channel switches. The communication links between each host computer and its corresponding storage system may be any appropriate medium suitable for data transfer, such as fiber communication channel links.

In an embodiment of the present invention, the host communicates with its corresponding storage system using small computer system interface (SCSI) commands.

System 100 includes source storage system 108 and target storage system 120. Each storage system includes physical storage units for storing data, such as disks or arrays of disks. Typically, storage systems 108 and 120 are target nodes. In order to enable initiators to send requests to storage system 108, storage system 108 exposes one or more logical units (LU) to which commands are issued. Thus, storage systems 108 and 120 are SAN entities that provide multiple logical units for access by multiple SAN initiators.

Logical units are a logical entity provided by a storage system, for accessing data stored in the storage system. A logical unit is identified by a unique logical unit number (LUN). In an embodiment of the present invention, storage system 108 exposes a logical unit 136, designated as LU A, and storage system 120 exposes a logical unit 156, designated as LU B.

In an embodiment of the present invention, LU B is used for replicating LU A. As such, LU B is generated as a copy of LU A. In one embodiment, LU B is configured so that its size is identical to the size of LU A. Thus for LU A, storage system 120 serves as a backup for source side storage system 108. Alternatively, as mentioned hereinabove, some logical units of storage system 120 may be used to back up logical units of storage system 108, and other logical units of storage system 120 may be used for other purposes.

Moreover, in certain embodiments of the present invention, there is symmetric replication whereby some logical units of storage system 108 are used for replicating logical units of storage system 120, and other logical units of storage system 120 are used for replicating other logical units of storage system 108.

System 100 includes a source side host computer 104 and a target side host computer 116. A host computer may be one computer, or a plurality of computers, or a network of distributed computers, each computer may include inter alia a conventional CPU, volatile and non-volatile memory, a data bus, an I/O interface, a display interface and a network interface. Generally a host computer runs at least one data processing application, such as a database application and an e-mail server.

Generally, an operating system of a host computer creates a host device for each logical unit exposed by a storage system in the host computer SAN. A host device is a logical entity in a host computer, through which a host computer may access a logical unit. In an embodiment of the present invention, host device 104 identifies LU A and generates a corresponding host device 140, designated as Device A, through which it can access LU A. Similarly, host computer 116 identifies LU B and generates a corresponding device 160, designated as Device B.

In an embodiment of the present invention, in the course of continuous operation, host computer 104 is a SAN initiator that issues I/O requests (write/read operations) through host device 140 to LU A using, for example, SCSI commands. Such requests are generally transmitted to LU A with an address that includes a specific device identifier, an offset within the device, and a data size. Offsets are generally aligned to 512 byte blocks. The average size of a write operation issued by host computer 104 may be, for example, 10 kilobytes (KB); i.e., 20 blocks. For an I/O rate of 50 megabytes (MB) per second, this corresponds to approximately 5,000 write transactions per second.

System 100 includes two data protection appliances, a source side DPA 112 and a target side DPA 124. A DPA performs various data protection services, such as data replication of a storage system, and journaling of I/O requests issued by a host computer to source side storage system data. As explained in detail hereinbelow, when acting as a target side DPA, a DPA may also enable rollback of data to an earlier point in time, and processing of rolled back data at the target site. Each DPA 112 and 124 is a computer that includes inter alia one or more conventional CPUs and internal memory.

For additional safety precaution, each DPA is a cluster of such computers. Use of a cluster ensures that if a DPA computer is down, then the DPA functionality switches over to another computer. The DPA computers within a DPA cluster communicate with one another using at least one communication link suitable for data transfer via fiber channel or IP based protocols, or such other transfer protocol. One computer from the DPA cluster serves as the DPA leader. The DPA cluster leader coordinates between the computers in the cluster, and may also perform other tasks that require coordination between the computers, such as load balancing.

In the architecture illustrated in FIG. 1, DPA 112 and DPA 124 are standalone devices integrated within a SAN. Alternatively, each of DPA 112 and DPA 124 may be integrated into storage system 108 and storage system 120, respectively, or integrated into host computer 104 and host computer 116, respectively. Both DPAs communicate with their respective host computers through communication lines such as fiber channels using, for example, SCSI commands.

In accordance with an embodiment of the present invention, DPAs 112 and 124 are configured to act as initiators in the SAN; i.e., they can issue I/O requests using, for example, SCSI commands, to access logical units on their respective storage systems. DPA 112 and DPA 124 are also configured with the necessary functionality to act as targets; i.e., to reply to I/O requests, such as SCSI commands, issued by other initiators in the SAN, including inter alia their respective host computers 104 and 116. Being target nodes, DPA 112 and DPA 124 may dynamically expose or remove one or more logical units.

As described hereinabove, Site I and Site II may each behave simultaneously as a production site and a backup site for different logical units. As such, DPA 112 and DPA 124 may each behave as a source DPA for some logical units and as a target DPA for other logical units, at the same time.

In accordance with an embodiment of the present invention, host computer 104 and host computer 116 include protection agents 144 and 164, respectively. Protection agents 144 and 164 intercept SCSI commands issued by their respective host computers, via host devices to logical units that are accessible to the host computers. In accordance with an embodiment of the present invention, a data protection agent may act on an intercepted SCSI commands issued to a logical unit, in one of the following ways:

Send the SCSI commands to its intended logical unit.

Redirect the SCSI command to another logical unit.

Split the SCSI command by sending it first to the respective DPA. After the DPA returns an acknowledgement, send the SCSI command to its intended logical unit.

Fail a SCSI command by returning an error return code.

Delay a SCSI command by not returning an acknowledgement to the respective host computer.

A protection agent may handle different SCSI commands, differently, according to the type of the command. For example, a SCSI command inquiring about the size of a certain logical unit may be sent directly to that logical unit, while a SCSI write command may be split and sent first to a DPA associated with the agent. A protection agent may also change its behavior for handling SCSI commands, for example as a result of an instruction received from the DPA.

Specifically, the behavior of a protection agent for a certain host device generally corresponds to the behavior of its associated DPA with respect to the logical unit of the host device. When a DPA behaves as a source site DPA for a certain logical unit, then during normal course of operation, the associated protection agent splits I/O requests issued by a host computer to the host device corresponding to that logical unit. Similarly, when a DPA behaves as a target device for a certain logical unit, then during normal course of operation, the associated protection agent fails I/O requests issued by host computer to the host device corresponding to that logical unit.

Communication between protection agents and their respective DPAs may use any protocol suitable for data transfer within a SAN, such as fiber channel, or SCSI over fiber channel. The communication may be direct, or via a logical unit exposed by the DPA. In an embodiment of the present invention, protection agents communicate with their respective DPAs by sending SCSI commands over fiber channel.

In an embodiment of the present invention, protection agents 144 and 164 are drivers located in their respective host computers 104 and 116. Alternatively, a protection agent may also be located in a fiber channel switch, or in any other device situated in a data path between a host computer and a storage system.

What follows is a detailed description of system behavior under normal production mode, and under recovery mode.

In accordance with an embodiment of the present invention, in production mode DPA 112 acts as a source site DPA for LU A. Thus, protection agent 144 is configured to act as a source side protection agent; i.e., as a splitter for host device A. Specifically, protection agent 144 replicates SCSI I/O requests. A replicated SCSI I/O request is sent to DPA 112. After receiving an acknowledgement from DPA 124, protection agent 144 then sends the SCSI I/O request to LU A. After receiving a second acknowledgement from storage system 108 may host computer 104 initiate another I/O request.

When DPA 112 receives a replicated SCSI write request from data protection agent 144, DPA 112 transmits certain I/O information characterizing the write request, packaged as a "write transaction", over WAN 128 to DPA 124 on the target side, for journaling and for incorporation within target storage system 120.

DPA 112 may send its write transactions to DPA 124 using a variety of modes of transmission, including inter alia (i) a synchronous mode, (ii) an asynchronous mode, and (iii) a snapshot mode. In synchronous mode, DPA 112 sends each write transaction to DPA 124, receives back an acknowledgement from DPA 124, and in turns sends an acknowledgement back to protection agent 144. Protection agent 144 waits until receipt of such acknowledgement before sending the SCSI write request to LU A.

In asynchronous mode, DPA 112 sends an acknowledgement to protection agent 144 upon receipt of each I/O request, before receiving an acknowledgement back from DPA 124.

In snapshot mode, DPA 112 receives several I/O requests and combines them into an aggregate "snapshot" of write activity performed in the multiple I/O requests, and sends the snapshot to DPA 124, for journaling and for incorporation in target storage system 120. In snapshot mode DPA 112 also sends an acknowledgement to protection agent 144 upon receipt of each I/O request, before receiving an acknowledgement back from DPA 124.

For the sake of clarity, the ensuing discussion assumes that information is transmitted at write-by-write granularity.

While in production mode, DPA 124 receives replicated data of LU A from DPA 112, and performs journaling and writing to storage system 120. When applying write operations to storage system 120, DPA 124 acts as an initiator, and sends SCSI commands to LU B.

During a recovery mode, DPA 124 undoes the write transactions in the journal, so as to restore storage system 120 to the state it was at, at an earlier time.

As described hereinabove, in accordance with an embodiment of the present invention, LU B is used as a backup of LU A. As such, during normal production mode, while data written to LU A by host computer 104 is replicated from LU A to LU B, host computer 116 should not be sending I/O requests to LU B. To prevent such I/O requests from being sent, protection agent 164 acts as a target site protection agent for host Device B and fails I/O requests sent from host computer 116 to LU B through host Device B.

In accordance with an embodiment of the present invention, target storage system 120 exposes a logical unit 176, referred to as a "journal LU", for maintaining a history of write transactions made to LU B, referred to as a "journal". Alternatively, journal LU 176 may be striped over several logical units, or may reside within of or a portion of another logical unit. DPA 124 includes a journal processor 180 for managing the journal.

Journal processor 180 functions generally to manage the journal entries of LU B. Specifically, journal processor 180 (i) enters write transactions received by DPA 124 from DPA 112 into the journal, by writing them into the journal LU, (ii) applies the journal transactions to LU B, and (iii) updates the journal entries in the journal LU with undo information and removes already-applied transactions from the journal. As described below, with reference to FIGS. 2 and 3A-3D, journal entries include four streams, two of which are written when write transaction are entered into the journal, and two of which are written when write transaction are applied and removed from the journal.

Figure 2:
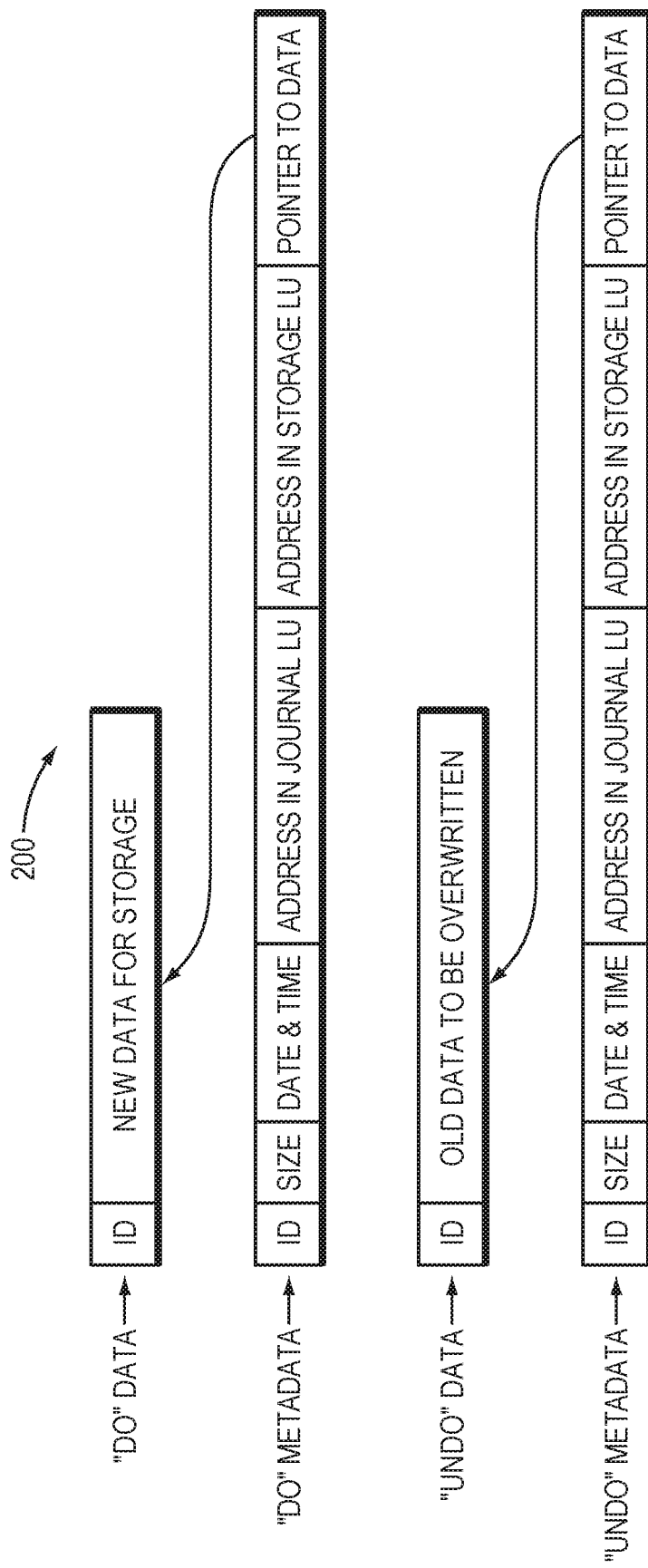
FIG. 2 is a simplified illustration of a write transaction for a journal, in accordance with an embodiment of the present disclosure.

Reference is now made to FIG. 2, which is a simplified illustration of a write transaction 200 for a journal, in accordance with an embodiment of the present invention. The journal may be used to provide an adaptor for access to storage 120 at the state it was in at any specified point in time. Since the journal contains the "undo" information necessary to rollback storage system 120, data that was stored in specific memory locations at the specified point in time may be obtained by undoing write transactions that occurred subsequent to such point in time.

Write transaction 200 generally includes the following fields:
  one or more identifiers;
  a time stamp, which is the date & time at which the transaction was received by source side DPA 112;
  a write size, which is the size of the data block;
  a location in journal LU 176 where the data is entered;
  a location in LU B where the data is to be written; and
  the data itself.

Write transaction 200 is transmitted from source side DPA 112 to target side DPA 124. As shown in FIG. 2, DPA 124 records the write transaction 200 in four streams. A first stream, referred to as a DO stream, includes new data for writing in LU B. A second stream, referred to as an DO METADATA stream, includes metadata for the write transaction, such as an identifier, a date & time, a write size, a beginning address in LU B for writing the new data in, and a pointer to the offset in the do stream where the corresponding data is located. Similarly, a third stream, referred to as an UNDO stream, includes old data that was overwritten in LU B; and a fourth stream, referred to as an UNDO METADATA, include an identifier, a date & time, a write size, a beginning address in LU B where data was to be overwritten, and a pointer to the offset in the undo stream where the corresponding old data is located.

In practice each of the four streams holds a plurality of write transaction data. As write transactions are received dynamically by target DPA 124, they are recorded at the end of the DO stream and the end of the DO METADATA stream, prior to committing the transaction. During transaction application, when the various write transactions are applied to LU B, prior to writing the new DO data into addresses within the storage system, the older data currently located in such addresses is recorded into the UNDO stream.

By recording old data, a journal entry can be used to "undo" a write transaction. To undo a transaction, old data is read from the UNDO stream in a reverse order, from the most recent data to the oldest data, for writing into addresses within LU B. Prior to writing the UNDO data into these addresses, the newer data residing in such addresses is recorded in the DO stream.

The journal LU is partitioned into segments with a pre-defined size, such as 1 MB segments, with each segment identified by a counter. The collection of such segments forms a segment pool for the four journaling streams described hereinabove. Each such stream is structured as an ordered list of segments, into which the stream data is written, and includes two pointers—a beginning pointer that points to the first segment in the list and an end pointer that points to the last segment in the list.

According to a write direction for each stream, write transaction data is appended to the stream either at the end, for a forward direction, or at the beginning, for a backward direction. As each write transaction is received by DPA 124, its size is checked to determine if it can fit within available segments. If not, then one or more segments are chosen from the segment pool and appended to the stream's ordered list of segments.

Thereafter the DO data is written into the DO stream, and the pointer to the appropriate first or last segment is updated. Freeing of segments in the ordered list is performed by simply changing the beginning or the end pointer. Freed segments are returned to the segment pool for re-use.

A journal may be made of any number of streams including less than or more than 5 streams. Often, based on the speed of the journaling and whether the back-up is synchronous or a synchronous a fewer or greater number of streams may be used.

Figure 3:
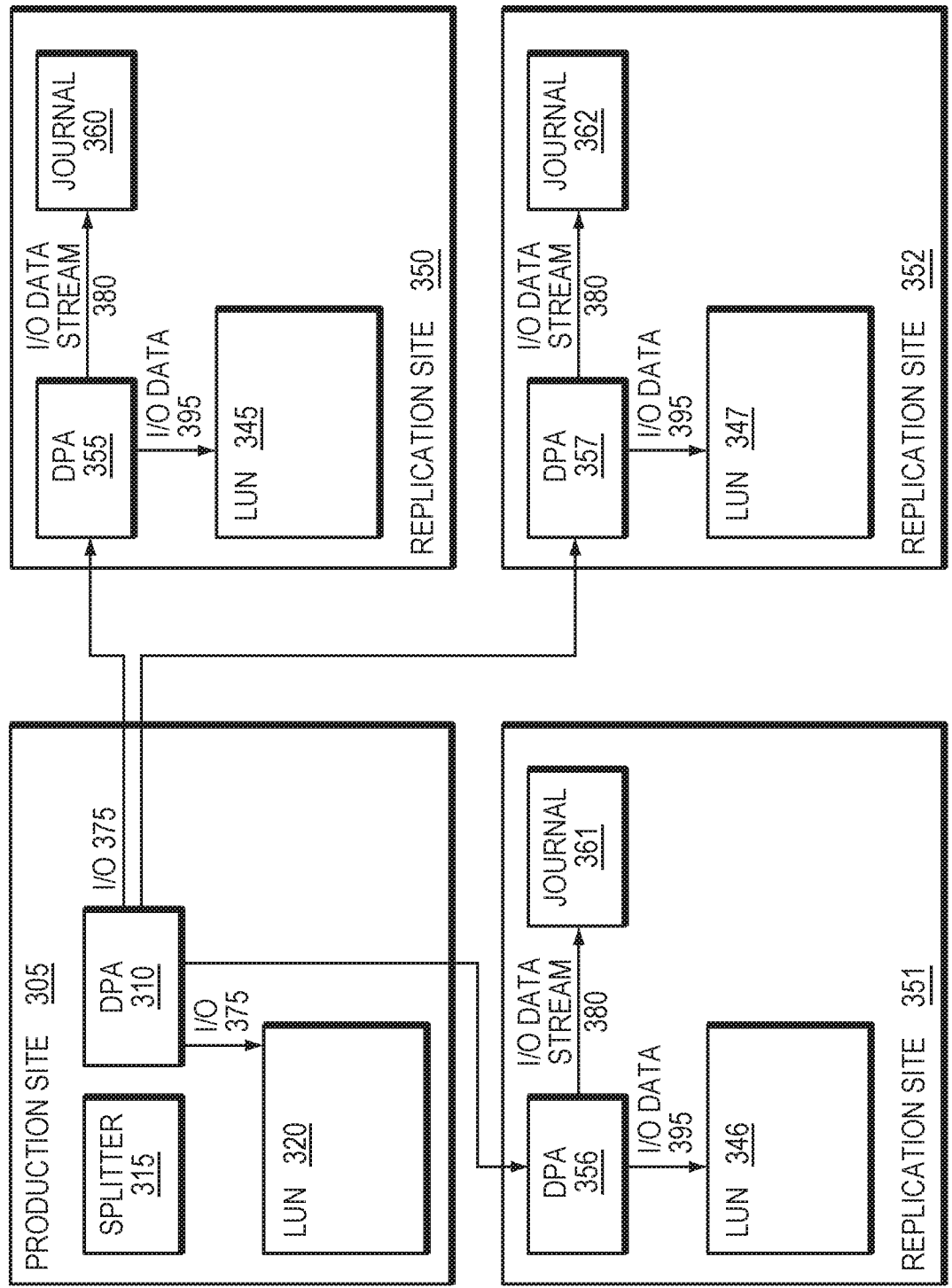
FIG. 3 is a simplified illustration of replication environment with multiple replication sites, in accordance with an embodiment of the present disclosure.

Refer now to the example embodiment of FIG. 3, which illustrates a production site splitting to replication sites. Production site has DPA 310, splitter 315, and LUN 320. Production site intercepts IO 375 that is being written to LUN 320. Production site sends IO 375 to replication site 350, replication site 351, and replication site 352. Each replication site has a data protection appliance, such as DPA 355, DPA 356, and DPA 357. Each replication site also has a LUN, such as LUN 345, LUN 346, and LUN 347. Each replication site has a journal such as journal 360, journal 361, and journal 362. Each journal is enabled to store points in time or snapshots.

Figure 4:
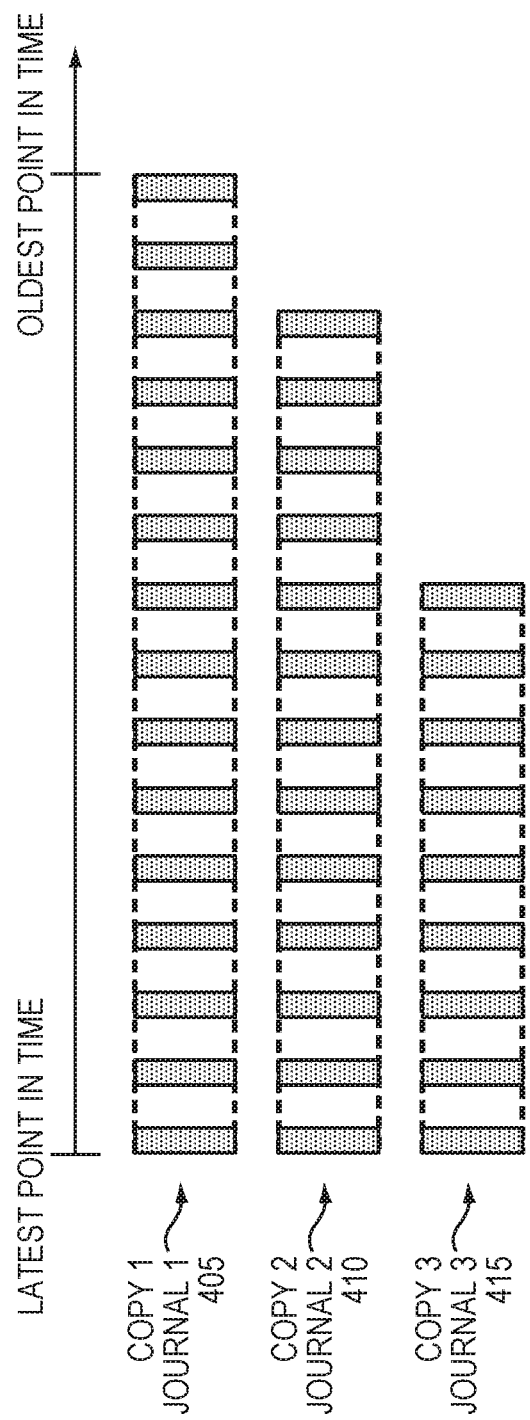
FIG. 4 is a simplified illustration of journals with points in time, in accordance with an embodiment of the present disclosure.

Refer now to the example embodiment of FIG. 4, which illustrates points of time in journals at replication sites. In the example embodiment of FIG. 4, copy 1 journal 1 405 illustrates a sample journal on a first replication site with 15 points of time, where each bar represents a point in time or snapshot. Copy 2 journal 2 410 illustrates a sample journal on a second replication site with 13 points of time, where each bar represents a point in time or snapshot. Copy 3 journal 3 415 illustrates a sample journal on a third replication site with 9 points of time, where each bar represents a point in time or snapshot. As noted in the picture 9 of the points in time in copy 3 journal 3 415 are present in both copy 2 journal 2 410 and copy 1 journal 1 405. As well in this embodiment, the points in time of copy 2 journal 2 410 are present in copy 1 journal 1 405. In this embodiment, there are 37 points of time across three replication sites, however there are 15 unique snapshots or points in time.

Figure 5:
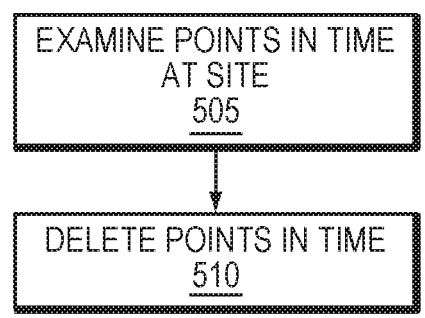
FIG. 5 is a simplified example of a method for consolidating points in time, in accordance with an embodiment of the present disclosure.

Refer now to the example embodiment of FIG. 5, which illustrates application of a consolidation policy. The points in time for a replication site, such as the points in time of copy 1 journal 1 305 of FIG. 3 are examined (step 505). Points in time are deleted (step 510). The method of FIG. 5 is applied to each replication site, such as the second and third replication sites of FIG. 4.

Figure 6:
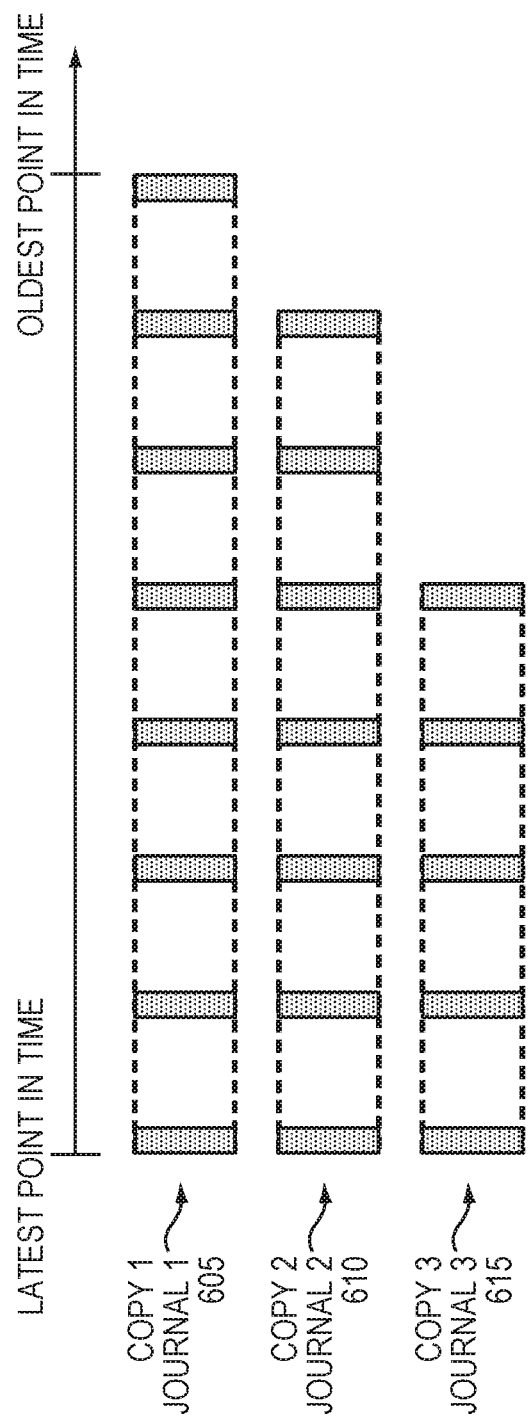
FIG. 6 is a simplified illustration of journals with consolidated points in time, in accordance with an embodiment of the present disclosure.

Refer now to the example embodiment of FIG. 6, which illustrates points of time in journals at replication sites after the application of a consolidation policy. In the example embodiment of FIG. 6, copy 1 journal 1 605 illustrates a sample journal on a first replication site with 8 points of time, where each bar represents a point in time or snapshot. Copy 2 journal 2 610 illustrates a sample journal on a second replication site with 7 points of time, where each bar represents a point in time or snapshot. Copy 3 journal 3 615 illustrates a sample journal on a third replication site with 5 points of time, where each bar represents a point in time or snapshot. As noted in the picture 5 of the points in time in copy 3 journal 3 615 are present in both copy 2 journal 2 610 and copy 1 journal 1 605. As well in this embodiment, the points in time of copy 2 journal 2 610 are present in copy 1 journal 1 605. In this embodiment, there are 20 points of time across three replication sites, however there are 8 unique snapshots or points in time. In the embodiments of FIGS. 4-6, the application of the method of FIG. 5 to the snapshots of FIG. 4 reduced the number of snapshots available at the replication sites, however, the number of unique snapshots was also reduced.

Figure 7:
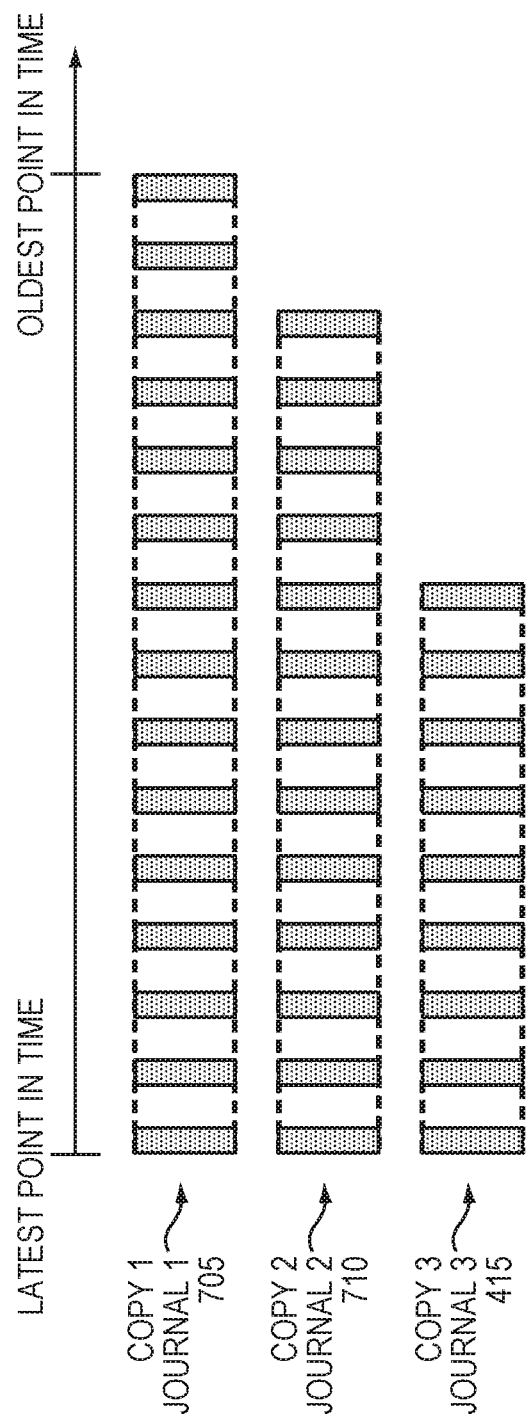
FIG. 7 is an alternative simplified illustration of journals with points in time, in accordance with an embodiment of the present disclosure.

Refer now to the example embodiment of FIG. 7, which illustrates points of time in journals at replication sites and is similar to that of FIG. 4. In the example embodiment of FIG. 7, copy 1 journal 1 705 illustrates a sample journal on a first replication site with 15 points of time, where each bar represents a point in time or snapshot. Copy 2 journal 2 710 illustrates a sample journal on a second replication site with 13 points of time, where each bar represents a point in time or snapshot. Copy 3 journal 3 715 illustrates a sample journal on a third replication site with 9 points of time, where each bar represents a point in time or snapshot. As noted in the picture 9 of the points in time in copy 3 journal 3 715 are present in both copy 2 journal 2 710 and copy 1 journal 1 705. As well in this embodiment, the points in time of copy 2 journal 2 710 are present in copy 1 journal 1 405. In this embodiment, there are 37 points of time across three replication sites, however there are 15 unique snapshots or points in time.

Figure 8:
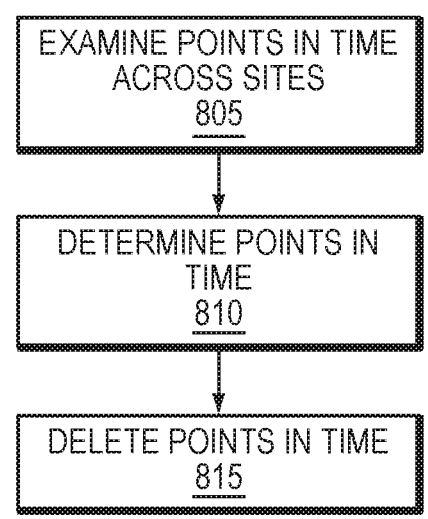

Refer now to the example embodiment of FIG. 8, which illustrates application of a global consolidation policy. The points in time for replication sites, such as the points in time of copy 1 journal 1 705, copy 2 journal 2 710, and copy 3 journal 3 715 of FIG. 7 are examined (step 805). Points of time to be deleted are determined (step 810). Points in time are deleted (step 815). In this embodiment, a deletion policy is put in place to maintain the availability of a maximum number of points in time and redundant access to the most recent point in time.

Figure 9:
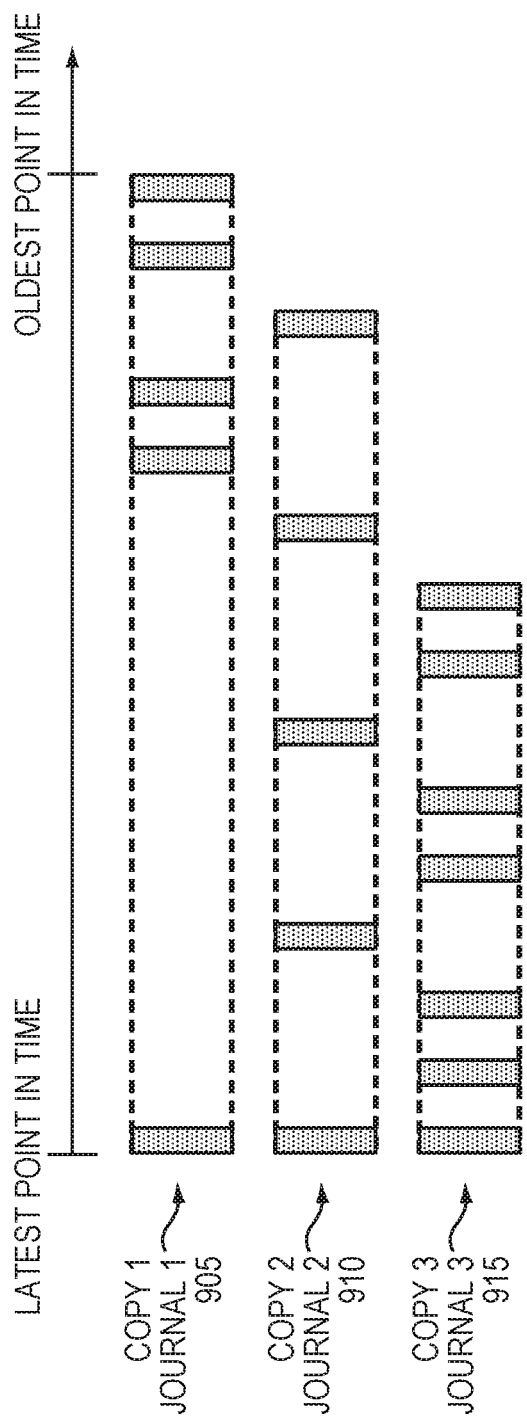
FIG. 9 is an alternative simplified illustration of journals with consolidated points in time, in accordance with an embodiment of the present disclosure.

Refer now to the example embodiment of FIG. 9, which will illustrates the application of a global consolidation policy, such as that of FIG. 8, to replication sites, such as those illustrated in FIG. 7. In the example embodiment of FIG. 9, there are three journal copies. Copy 1 journal 1 905 has 5 points in time. Copy 2 journal 2 910 has 5 points in time. Copy 3 journal 3 915 has 7 points in time. In this embodiment, there are 15 unique points in time and 17 total points in time. In this embodiment, redundant points of time have been deleted across the points of time except for the latest point of time, which is kept across replication sites. In this embodiment, the application of a global replication policy has enabled access to more points in time across the replication sites while reducing the overall number of storage or space needed to store the points in time.

In certain embodiments, the determination of which points in time to delete may be based on a number of criteria. In some embodiments, points in time that need to be accessed quickly may be deleted on slower replication site but kept on faster replication sites. In many embodiments, important points of time may be kept redundantly on multiple replication sites. In certain embodiments, a global consolidation policy may keep application consistent points in time across journals. In other embodiments, a global consolidation policy may keep an oldest point in time across multiple journals. In many embodiments, a bookmark may be kept across multiple journals. In certain embodiments, snapshots may be a limited resource and a global consolidation policy may help free this resource.

In some embodiments, points in time across journals may be ranked and points in time below a certain ranking may be deleted. In certain embodiments, a global consideration policy may use machine learning to decide which points in time or snapshots may be delete. In further embodiments, a user may determine what snapshots should be deleted. In some embodiments, a user may determine a global consolidation policy to determine what snapshots should be deleted.

Figure 10:
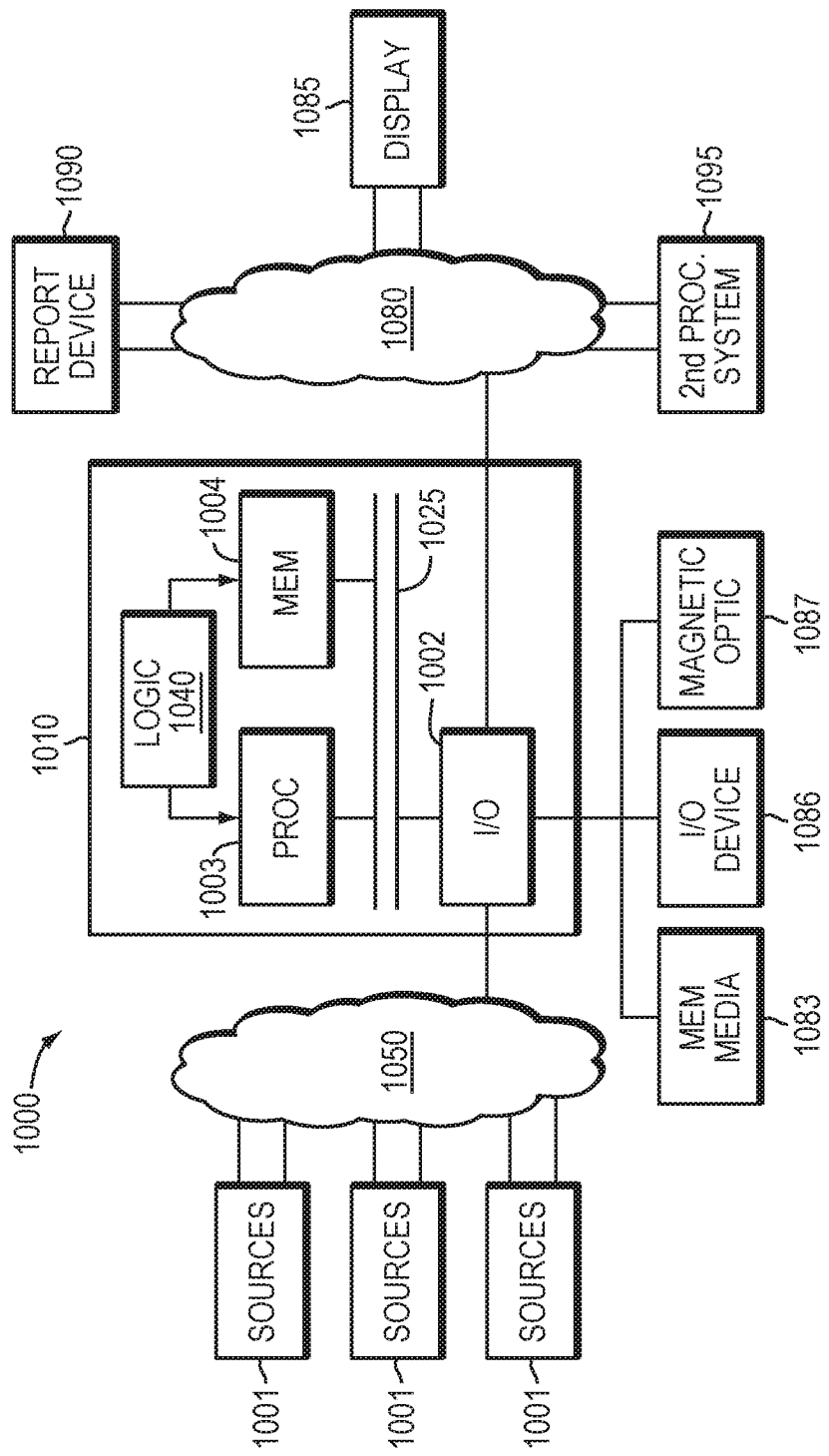
FIG. 10 is an example of an embodiment of an apparatus that may utilize the techniques described herein, in accordance with an embodiment of the present disclosure.
Figure 11:
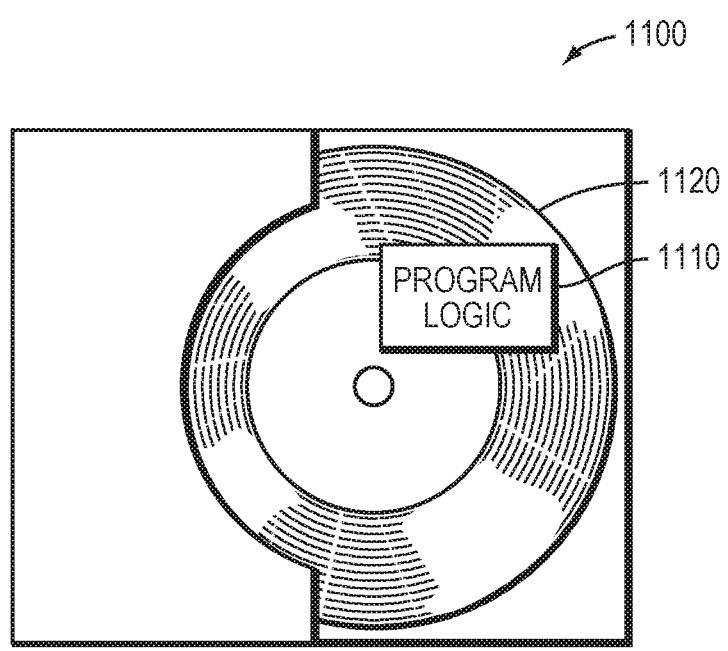
FIG. 11 is an example of an embodiment of a method embodied on a computer readable storage medium that may utilize the techniques described herein in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 10, the machine becomes an apparatus for practicing the invention. When implemented on one or more general-purpose processors, the program code combines with such a processor 1003 to provide a unique apparatus that operates analogously to specific logic circuits. As such a general purpose digital machine can be transformed into a special purpose digital machine. FIG. 11 shows Program Logic 1110 embodied on a computer-readable medium 1120 as shown, and wherein the Logic is encoded in computer-executable code configured for carrying out the reservation service process of this invention and thereby forming a Computer Program Product 1100. The logic 1110 may be the same logic 1040 on memory 1004 loaded on processor 1003. The program logic may also be embodied in software modules, as modules, or as hardware modules. A processor may be a virtual processor or a physical processor. Logic may be distributed across several processors or virtual processors to execute the logic.

The logic for carrying out the method may be embodied as part of the system described below, which is useful for carrying out a method described with reference to embodiments shown in, for example, FIGS. 5 and 8. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system comprising:
 a production site; wherein the production site is communicatively coupled to replication sites; wherein each replication site of the replication sites includes a journal; and
 computer-executable logic operating in memory, wherein the computer-executable program logic is configured for execution across one or more processor of:
  examining, for each point in time across the journals of the replication sites, snapshots stored on the replication sites that are associated with the point in time under examination, wherein each journal comprises a record of write transactions;
  determining, for each point in time across the journals of the replication sites, a set of snapshots associated with the point in time to be deleted based on a policy; and
  deleting the set of snapshots from the journals of the replication sites.

2. The system of claim 1 wherein the determining of the set of snapshots minimizes the number of snapshots while maximizing the available points in time.

3. The system of claim 1 wherein the determining of the set of snapshots ensures that application consistent points of time are retained across journals.

4. The system of claim 1 wherein the determining of the set of snapshots includes a ranking for the snapshots and ensures that highly ranked snapshots are not deleted from highly accessible journals.

5. The system of claim 1 wherein the determining of the set of snapshots minimizes the number of points in time in a journal.

6. The system of claim 1, wherein the computer-executable program logic is further configured for execution across one or more processors of:
 identifying a snapshot present in the journals of at least two replication sites at the same point in time.

7. The system of claim 6, wherein the computer-executable program logic is further configured for execution across one or more processors of:
 determining, based on a policy, which snapshot present in the journals of the at least two replication sites at the same point in time to delete; and
 deleting the determined snapshot, while maintaining the same snapshot on a journal of another replication site at the point in time.

8. A computer program product comprising:
 a non-transitory computer readable medium encoded with computer executable program, the code enabling execution across one or more processors of:
  examining, for each point in time across journals of a plurality of replication sites, snapshots stored on the replication sites that are associated with the point in time under examination, wherein a production site is communicatively coupled to the replication sites, wherein each journal comprises a record of write transactions, wherein each replication site of the replication sites includes a journal;

determining, for each point in time across the journals of the replication sites, a set of snapshots associated with the point in time to be deleted based on a policy; and deleting the set of snapshots from the journals of the replication sites.

9. The computer program product of claim 8 wherein the determining of the set of snapshots minimizes the number of snapshots while maximizing the available points in time.

10. The computer program product of claim 8 wherein the determining of the set of snapshots ensures that application consistent points of time are retained across journals.

11. The computer program product of claim 8 wherein the determining of the set of snapshots includes a ranking for the snapshots and ensures that highly ranked snapshots are not deleted from highly accessible journals.

12. The computer program product of claim 8 wherein the determining of the set of snapshots minimizes the number of points in time in a journal.

13. The computer program product of claim 8 wherein each journal of the journals is enabled to have a different set of access parameters; wherein the access parameters denote how quickly the snapshot may be reached; wherein the access parameters include access speed to a medium containing the journal and the access speed of the medium.

14. The computer program product of claim 13 wherein the determining of the set of snapshots ensures that the most current point in time is kept across the journals.

15. The computer program product of claim 13 wherein the determining of the set of snapshots minimizes the number of points in time in a journal.

16. A computer implemented method comprising:

examining, for each point in time across journals of a plurality of replication sites, snapshots stored on the replication sites that are associated with the point in time under examination, wherein a production site is communicatively coupled to the replication sites, wherein each journal comprises a record of write transactions, wherein each replication site of the replication sites includes a journal;

determining for each point in time across the journals of the replication sites, a set of snapshots associated with the point in time to be deleted based on a policy; and deleting the set of snapshots from the journals of the replication sites.

17. The method of claim 16 wherein the determining of the set of snapshots minimizes the number of snapshots while maximizing the available points in time.

18. The method of claim 16 wherein the determining of the set of snapshots ensures that application consistent points of time are retained across journals.

19. The method of claim 16 wherein the determining of the set of snapshots includes a ranking for the snapshots and ensures that highly ranked snapshots are not deleted from highly accessible journals.

20. The method of claim 16 wherein the determining of the set of snapshots minimizes the number of points in time in a journal.

* * * * *